2,824,792

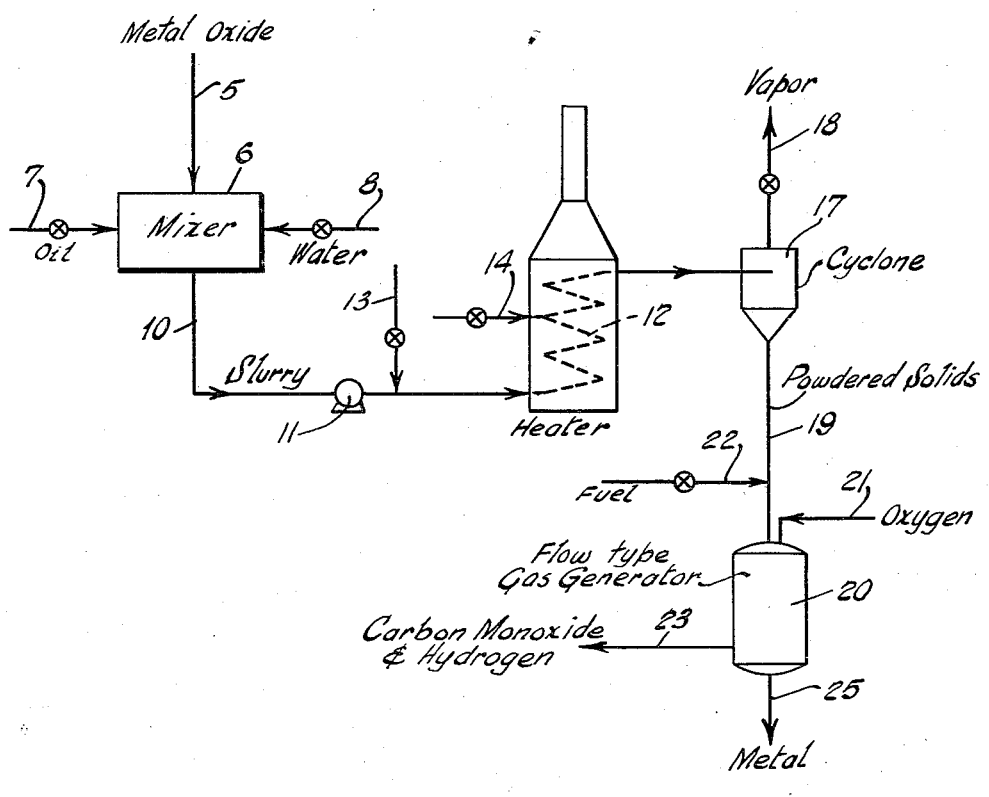

METHOD OF REDUCING METAL OXIDES

Harry V. Rees, Chappaqua, and Frederick Burton Sellers, Tarrytown, N. Y., assignors to Texaco Development Corporation, New York, N. Y., a corporation of Delaware Application February 15, 1955, Serial No. 488,248

8 Claims. (Cl. 75—26)

This invention relates to a process for the reduction of a metal oxide with a carbonaceous fuel and the simultaneous production of carbon monoxide and hydrogen. In one of its more specific aspects, this invention relates to a process for the simultaneous reduction of an iron oxide to metallic iron and the partial oxidation of a liquid hydrocarbon to carbon monoxide and hydrogen. Hydrocarbon gas, oil, coke, and various coals including lignite, anthracite, and bituminous coals are suitable as fuels for the process of this invention.

In the process of the present invention, a reducible metal oxide in powdered form is dispersed in an oxygen-containing gas and interacted with oxygen and a carbonaceous fuel at a temperature above 2,000° F. The particles of solid reactants are dispersed in gaseous reactants and reaction products in the reaction zone. Reduction of the metal oxide releases oxygen for oxidation of carbon from the fuel. Free oxygen is added in an amount sufficient to supply the necessary heat for the reaction with the simultaneous production of carbon monoxide. The reduction product of the metal oxide, e. g., the metal, is removed from the generator, generally in molten form. Gaseous products of reaction comprising carbon monoxide and hydrogen are also formed and may be recovered for fuel or as feed gas for chemical processes.

The present invention is particularly suited to the production of pig iron from iron ore and the simultaneous gasification of a liquid hydrocarbon by reaction with steam and oxygen to produce carbon monoxide and hydrogen. A flow-type gas generator of the type employed for production of synthesis gas from the fuel and an oxygen containing gas is used in the present process. Such a generator is disclosed in the patent to Du Bois Eastman and Leon P. Gaucher, 2,582,938.

The flow-type generator is characterized by the reaction of a gaseous dispersion of fuel with oxygen in an unpacked and unobstructed reaction zone. It is important that the reaction zone be compact, presenting a relatively small amount of surface in comparison with its volume and that it be designed to minimize heat losses by radiation. It is preferable to arrange the inlet and outlet of the reaction zone relative to one another such that the reactants and reaction products flow substantially uniformly through the reaction zone, for example, as by introducing the reactants at or near one end and withdrawing reaction products at or near the other.

The reaction zone preferably is generally cylindrical in shape with an internal surface area not greater than about one and one-half times the surface of a sphere of equal volume. Openings and "black body" surfaces are kept at a minimum to prevent loss of radiant heat from the reaction space. Free transfer of heat by radiation is achieved in this type reaction vessel so that the entire reaction zone operates essentially at a single uniform temperature. The quantity of fuel supplied to the generator is just sufficient to react with oxygen and steam present therein so that the fuel is almost completely consumed.

For most successful operation of a generator of this type for the production of carbon monoxide, the temperature throughout the generator must be maintained within the range of from about 2,000° F. to about 3,000° F., or higher. Practical considerations, especially apparatus limitations, usually limit the maximum operating temperature to about 2,600° F. At these temperatures, the slag from the fuel and metal oxide, if present, are molten and fluid.

In accordance with one embodiment of the present invention, a reducible metal oxide, e. g., iron oxide, is admixed with water to form a slurry. The slurry is passed through a tubular heating zone as a continuous stream. The slurry is heated in the heating zone to a temperature at least sufficient to vaporize the water. Vaporization of the water to steam results in a great increase in volume which in turn greatly increases the velocity in flow of the stream. The solid particles are suspended in the stream of steam forming a dispersion and are subjected to the disintegrating action of the highly turbulent flow of the confined stream of steam. The dispersion of powdered solids is passed into admixture with oxygen and fuel in a flow-type generator maintained at a temperature above about 2,000° F. All of the steam may be passed to the generator or part or all of the steam may be separated from the dispersion. Liquid hydrocarbon may replace all or part of the water as the slurrying medium.

Oxygen from the metal oxide enters into reaction with a portion of the carbon from the fuel to produce carbon oxides. Additional oxygen is supplied in uncombined form in an oxygen-containing gas stream, preferably with a high concentration of free oxygen, to provide the amount necessary to maintain the reaction temperature. The total oxygen supplied to the reactor, as both free and available combined oxygen, relative to the carbon in the fuel may be expressed as the O/C ratio where O represents pound atoms of oxygen, and C, the pound atoms of carbon. Generally, the total oxygen necessary to supply the heat requirements of the process will be considerably in excess of the amount theoretically required to convert all of the carbon to carbon monoxide. The total O/C ratios may vary from about 1.05 to about 2.0, depending upon the relative amounts of fuel and metal oxide supplied to the generator.

Suitable metal oxides include the oxides of iron, copper, vanadium and barium. The reduction product may be reconverted to the desired metal oxide or utilized as a product of the process. Barium peroxide, for example, is readily converted to barium oxide and is easily reconverted to the peroxide.

The reduction product of the metal oxide, i. e., either metal or a lower metal oxide, may be removed from the generator either as solid particles entrained in the product gases, or withdrawn separately in molten form. With an iron oxide, or iron ore, as the metal oxide, it is preferable to operate the generator at a temperature on the order of 2,500° F. or higher and to draw off both iron and slag in molten form, as in blast furnace operations.

The generator pressure may vary from atmospheric pressure to an elevated pressure on the order of 500 pounds per square inch gauge, or higher. Limitations imposed by structural materials and the high temperatures required, will determined the allowable operating pressure.

The quantity of liquid admixed with the solid to form a fluid slurry may vary considerably. A minimum of about 35 percent liquid by volume is required, based upon the apparent volume of the granular solid. The slurry may be readily pumped with suitable equipment, for example, with a piston pump of the type commonly used for handling drilling mud in oil well drilling operations.

The solid feed material need be reduced only to a particle size such that it may be readily handled as a suspension or a slurry. It is preferable to use particles smaller than about ¼ inch in average diameter; particles of 100 mesh size and smaller are more readily handled in a slurry and are preferred. In general, a satisfactory slurry may be prepared with a composite mixture of particles smaller than ¼ inch in size, the bulk of which comprises particles within the range of from about ¼ inch to 200 mesh.

The slurry is heated by passing it through an elongated externally heated tubular heating zone of restricted cross-sectional area. The heating may be effectively carried out in a tubular helical coil or pipe still type furnace, such as the furnaces commonly used for heating liquid streams in the refining of petroleum. The slurry is fed into the heated tube at a rate sufficient to prevent settling out of the solid particles. The linear velocity of slurry at the inlet to the heating tube should generally be within the range of from about ½ to 10 feet per second, suitably about 1 foot per second. The velocity of gaseous dispersion of powdered coal and vapor, e. g., at the outlet of the tube, is within the range of from about 25 to about 2000 feet per second, suitably about 300 feet per second. Higher velocities may be used.

Pressure, in itself, is not critical in the heating step. The temperature and pressure relationships effecting vaporization are well known. The pressure may be coordinated with associated processes.

A potassium salt, preferably potassium carbonate, may be added to the slurry to increase the rate of burning of the fuel and fluxing of ash and slag in the generator.

A portion of the free oxygen, preferably a minor amount, may be added to the slurry charged to the heating zone. Some reaction may take place between the oxygen or metal oxide and the fuel in the heating zone. This reaction increases the temperature in the heating zone and aids in the disintegration of the solid materials.

A flux may be used to reduce the fusion temperature of the slag or to render it more fluid. Lime is generally suitable as the flux, where one is indicated, although it may be desirable to add fluorite, silica or alumina to increase the quantity or fluidity of the slag. The addition of lime to the generator not only increases fluidity of the slag and decreases the fluxing temperature but also effects removal of at least a portion of the hydrogen sulfide from the product gas stream from feed materials containing sulfur. The amount of lime required as flux may be determined from the composition of the iron ore and ash. In general, the most satisfactory fusion is obtained when the sum of the lime and magnesia in the feed is approximately equal in weight to the sum of the silica and alumina. The lime and magnesia may be added in the form of the carbonates, but should be converted to equivalent quantities of the oxides in determining the quantity of flux required.

Oxygen-enriched air or commercially pure oxygen may be used in the process. Commercially pure oxygen is preferred, especially for the generation of gases free from nitrogen, e. g., hydrocarbon synthesis feed gas. In the generation of gas for ammonia synthesis, it may be desirable to use oxygen-enriched air.

The invention will be more readily understood from the accompanying drawings and the following detailed description of preferred modes of operation of the process. For convenience in the description of the process, as illustrated in the drawings, iron oxide is referred to as the reducible metal oxide. It is to be understood that while iron oxide is taken as a preferred example for the purpose of illustration, other metal oxides may be admixed with or substituted for iron oxide.

The figure is a diagrammatic elevational view showing a suitable arrangement of apparatus for carrying out a specific embodiment of the present invention.

With reference to the drawing, metal oxide, e. g., crushed iron ore, is introduced through line 5 into a mixer 6. Sufficient liquid to form a fluid dispersion, or slurry, is admitted to the mixer through line 7 or through line 8, or both. As indicated in the drawing, a hydrocarbon liquid, e. g., fuel oil, may be supplied through line 7, while water may be supplied through line 8. Additive materials, e. g., a flux, oxidation catalyst, or an emulsifying agent, may be added to the mixer with the metal oxide, oil, or water. The resulting slurry of solid particles in liquid is passed through line 10 to a pump 11 from which it is passed through a tubular heater 12. Steam or gas may be introduced into the slurry feed stream ahead of the heater through line 13 or into the heating coil 12 through line 14.

Either water or oil, or a mixture of oil and water, may be used as the liquid medium in the preparation of the slurry. Heavy fuel oils or crude residua may be effectively employed in this process. Since the heavier oils have nearly the same density as water, they are generally rather readily mixed with water to form an emulsion which may be used in the preparation of the slurry. The metal oxide particles aid in the preparation of a homogeneous water-oil mixture. In some instances, particularly with lighter oils, it may be desirable to employ emulsifying agents.

The slurry is heated in heater 12 to a temperature at least sufficient to vaporize the liquid. The resulting dispersion of solid particles in vapor is discharged into a cyclone separator 17. Part or all of the vapor may be separated from the dispersion in the cyclone separator. Vapors are discharged from the separator 17 through line 18. The solids are passed through line 19 into a flow-type generator 20. Oxygen is supplied to the generator through line 21.

A gaseous product comprising mainly carbon monoxide and hydrogen is discharged from the generator through line 23. The metal oxide reduction product, e. g., molten metal, is drawn off through line 25.

When oil is used in the preparation of the slurry, the heater may be employed to vaporize the oil with minimum decomposition or cracking of the oil. On the other hand, the oil may be cracked to any desired extent by controlling the conditions in the heating coil.

If vaporization without cracking is desired, it is advantageous that steam be present in the heater to reduce the partial pressure of the oil and aid in its vaporization. Steam may be supplied from water contained in the slurry and converted into steam in the heater. Alternatively, or conjunctively, steam from an external source may be added to the slurry charged to the heating zone or it may be introduced into the heating zone at a point along the path of flow through the heater. Gas, for example, hydrogen or a gaseous hydrocarbon, may be introduced into the stream of slurry or into the heating coil in a similar manner.

If desired, the heater may be operated to crack the oil so that the stream discharged from the heater into the cyclone comprises the oil vapors, including products of cracking, and the metal oxide (or its reduction products). The oil vapors may be substantially completely separated from the solid and processed for the recovery of desirable products. Coke resulting from cracking of the oil in the heater may be deposited on the particles of metal oxide. Any coke present on the metal oxide particles fed to the gas generator helps reduce the metal oxide in the generator.

The metal oxide may serve as a catalyst for the conversion of the hydrocarbon. A specific catalyst, for example, a cracking catalyst, a hydrogenation catalyst, or a hydrocracking catalyst may be added to the metal oxide. As examples of suitable catalysts, silica, alumina, bauxite, magnesia, lime, and acid-treated clays, optionally containing oxides or sulfides of metals of groups V to VIII of the periodic table, for example, the following metals, their oxides or sulfides: iron, molybdenum, cobalt, manganese, vanadium, tungsten, chromium, zinc, uranium, nickel, or rare earths. When a metal, its oxide or sulfide, is employed as a cracking catalyst, it is generally desirable to choose as catalyst a metal, or the compound of a metal which is desirable in the reduction product of the major metal oxide reduced in the process.

For example, vanadium, nickel, chromium, cobalt or molybdenum are often desirable in steel so that one or more of these metals or their compounds may advantageously be employed in the reduction of iron oxide. Alumina, silica, magnesia and lime are, as previously mentioned, fluxing agents which, in addition to catalytic properties, may be useful for the removal of impurities from the ore by forming a slag which may be separated from the molten metal.

In a specific example of a mode of operation of the process of this invention, a mixture of oil and water is used for the preparation of a slurry of metal oxide particles, for example iron oxide. The relative proportions of oil and water are so chosen as to meet the fuel and steam requirements of the generator. The slurry is passed through the heater wherein the oil and water are completely vaporized forming a dispersion of metal oxide particles in vapor. The resulting dispersion is passed directly into the generator without any separation of vapor therefrom. Oxygen in the required amount is supplied to the generator into admixture with the steam, hydrocarbon vapors and solids. The oxygen, steam, hydrocarbon and metal oxide react in the generator to form carbon monoxide and hydrogen with the simultaneous reduction of the metal oxide. The metal oxide reduction product, for example iron, is withdrawn from the generator in molten form.

Fuel may be supplied to the generator through line 22 as required for operation of the generator. When fuel is supplied to the generator through line 22, preferably the fuel is a hydrocarbon. Either liquid or gaseous hydrocarbons may be used. Most advantageously, when conversion of the hydrocarbon takes place in heating coil 12, at least the major portion of the vapors is separated from the dispersion in separator 17 and processed for recovery of desirable constituents. Undesirable hydrocarbons, e. g., gases and high carbon residuum, may be passed through line 22 as fuel for the generator. Other carbonaceous fuels, e. g., solid fuels including coke and coal, may be employed as fuel for the generator.

The following examples illustrate the application of the process to the reduction of iron ore to pig iron while at the same time producing carbon monoxide and hydrogen in good yields.

Iron ore from the Mesabi Range containing 90 weight percent iron oxide and about 7.5 weight percent silica is mixed with heavy fuel oil to form a slurry. The oil has the following characteristics:

| | | |
|---|---|---|
| API gravity | degrees | 14.0 |
| Flash | °F | 405 |
| Pour | °F | 65 |
| Heating value | B. t. u./lb | 18,255 |
| Wt. analysis: | | |
| Carbon | wt. percent | 83.76 |
| Hydrogen | do | 10.99 |
| Nitrogen | do | 0.66 |
| Sulfur | do | 3.73 |
| Oxygen | do | 0.86 |
| | | 100.00 |

Limestone containing 97.3 weight percent calcium carbonate and 1.6 percent magnesium carbonate is used as flux. The limestone is mixed with the ore and oil to form the slurry. The slurry is pumped through a heating coil where it is heated to 800° F. The resulting preheated slurry is contacted with 800° F. steam in an atomizing nozzle in a flow-type gas generator where it is atomized into admixture with oxygen of 99.5 volume percent purity preheated to 295° F.

The generator is operated at about 2,800° F. and 220 pounds per square inch gauge. For each ton of iron ore charged to the generator 203 pounds of limestone, 2,408 pounds of oil, 1,348 pounds of water and 30,223 standard cubic feet of oxygen are required. For each ton of iron ore charged to the process 1,323 pounds pig iron and 139,784 standard cubic feet of gas are produced. The pig iron produced in the process contains 95 weight percent iron, about 3 weight percent carbon and about 1.5 percent silica.

The gas produced in the process has the following composition on a wet basis:

| | Mol percent |
|---|---|
| $H_2$ | 31.0 |
| CO | 38.7 |
| $CO_2$ | 6.9 |
| $N_2$ | 0.3 |
| $H_2O$ | 21.9 |
| $H_2S$ | 0.7 |
| COS | 0.1 |
| $CH_4$ | 0.4 |
| | 100.00 |

The gas produced in the process may be purified and treated to produce valuable by-product gas having a net heating value of about 300 B. t. u. per cubic foot or a synthesis gas or hydrogen-rich stream.

Obviously, many modifications and variations of the invention, as hereinbefore set forth, may be made without departing from the spirit and scope thereof, and therefore only such limitations should be imposed as are indicated in the appended claims.

We claim:

1. A process for the simultaneous reduction of a reducible solid metal oxide and the production of carbon monoxide and hydrogen which comprises admixing said metal oxide in solid particle form with sufficient liquid hydrocarbon to form a slurry; passing said slurry as a confined stream in turbulent flow through a tubular heating zone; heating said slurry to an elevated temperature at least sufficient to vaporize said liquid hydrocarbon; discharging the resulting dispersion comprising heated solid and hydrocarbon vapor into a reaction zone into admixture with gas containing free oxygen; effecting interaction of said metal oxide, hydrocarbon and oxygen in the reaction zone at a temperature above about 2,000° F. and recovering from the reaction zone the reduction product of the metal oxide and a gaseous product comprising carbon monoxide and hydrogen.

2. A process as defined in claim 1 wherein the temperature within the reaction zone is above the melting point of the reduction product of the metal oxide.

3. A process as defined in claim 1 wherein steam is supplied to said reaction zone as a reactant.

4. A process as defined in claim 1 wherein said solid metal oxide is an oxide of iron.

5. A process for the simultaneous reduction of a reducible solid metal oxide and the production of carbon monoxide and hydrogen which comprises admixing said metal oxide in particle form with a liquid hydrocarbon and water to form a slurry; passing said slurry as a confined stream in turbulent flow through a tubular heating zone wherein said liquid hydrocarbon and the water are vaporized; forming a dispersion comprising said particles of metal oxide in vapor; introducing said dispersion into a reaction zone into intimate admixture with gas comprising free oxygen; effecting interaction of said metal oxide, hydrocarbon, steam and oxygen in the reaction zone at a temperature above about 2,000° F.; and recovering from the reaction zone the reduction product of the metal oxide and a gaseous product comprising carbon monoxide and hydrogen.

6. A process as defined in claim 5 wherein said metal oxide is an oxide of iron and said gas containing free oxygen is substantially pure oxygen.

7. A process according to claim 4 wherein limestone is supplied to the reaction zone as a flux and the reduction products comprises molten metallic iron.

8. A process according to claim 5 wherein said reaction zone is maintained at a superatmospheric pressure on the order of 200 to 500 p. s. i. g.

References Cited in the file of this patent

UNITED STATES PATENTS

| | | |
|---|---|---|
| 2,019,785 | Janssen | Nov. 5, 1935 |
| 2,307,997 | Dill | Jan. 12, 1943 |
| 2,481,217 | Hemminger | Sept. 6, 1949 |
| 2,562,813 | Ogorzaly et al. | July 31, 1951 |
| 2,638,414 | Lewis | May 12, 1953 |
| 2,671,765 | McGrath et al. | Mar. 9, 1954 |
| 2,702,240 | Rees et al. | Feb. 15, 1955 |